May 3, 1960     J. O. WOODMAN     2,934,984
DENT REMOVING HAND TOOL FOR SHEET METAL
Filed April 3, 1959
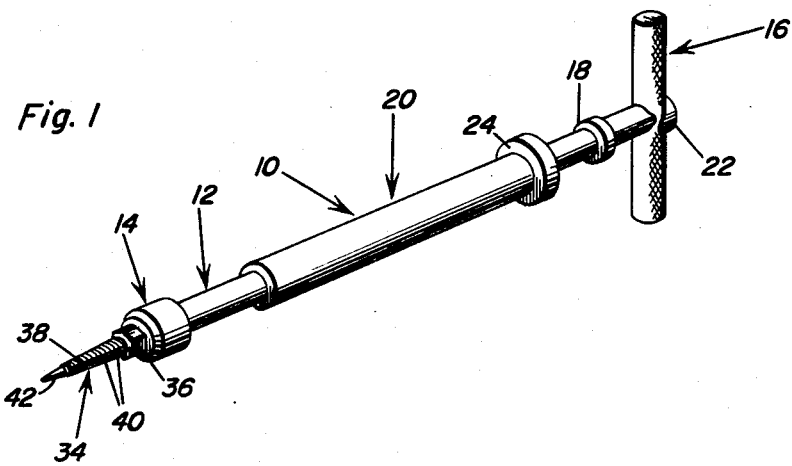
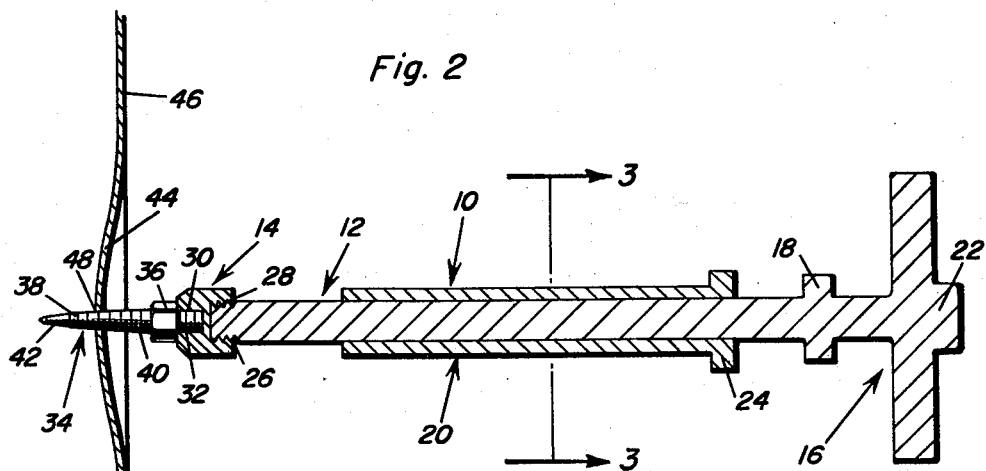
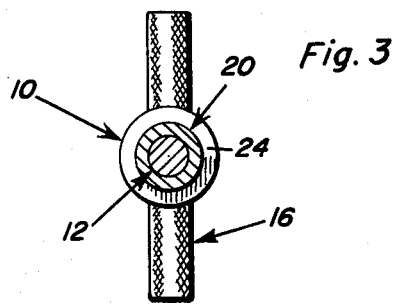
Jess O. Woodman
INVENTOR.

United States Patent Office 2,934,984
Patented May 3, 1960

2,934,984

DENT REMOVING HAND TOOL FOR SHEET METAL

Jess O. Woodman, Alton, Ill.

Application April 3, 1959, Serial No. 803,938

2 Claims. (Cl. 81—15)

This invention relates to a new and useful dent remover and more particularly relates to a tool for removing small dents in body panels of motor vehicles and the like.

In many instances, especially with the higher priced automobiles of today, to protect his costly investment an automobile owner will endeavor to keep the body of his automobile in good condition so that it will have a pleasing appearance to the eye. Since the automobile industry is placing great emphasis on the design and outward appearance of their automobiles, many of the owners of newer automobiles are making an effort to maintain their automobiles so that they have a good outward appearance for many reasons which are not enumerated herein.

The main object of this invention is to provide a tool for removing the smaller dents from body panels which are not accessible from the reverse side of the dented panel without the removal of a considerable amount of other body panels, trim, and the like.

A further object, in accordance with the preceding object, is to provide a tool which will effectively remove dents from body panels with the least amount of effort and in the shortest time possible.

Still another object is to provide a tool for removing dents from body panels and the like that is of such configuration so as to enable it to be positioned and used with success on substantially every outer body panel that a vehicle may have.

A still further object, in accordance with the preceding objects, is to provide a body tool for removing dents from body panels and the like that does not require the use of special acetylene torches to restore the body panel to its original position.

Yet another object, in accordance with the preceding object, is to provide a body tool which, even when body lead is to be used, requires the use of only a blow torch or the like for applying the body lead. The blow torch is not capable of producing the higher temperatures made possible by the acetylene torch which in many instances is used to remove dents from body panels, the excessive heat thereof sometimes causing the body panel to warp or expand necessitating that the metal around the dent be shrinked, this being difficult to do without producing a wavy body panel.

A final object to be enumerated herein is to provide a dent removing tool which is of simple design and of rigid construction and therefore a tool which will be relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the dent remover;

Figure 2 is an enlarged longitudinal vertical sectional view of the tool taken substantially upon its longitudinal center line showing the manner in which it is to be secured to a body panel having a dent therein; and Figure 3 is a transverse vertical sectional view taken substantially upon the plane indicated by the section line 3—3 of Figure 2.

Referring now more specifically to the drawings the numeral 10 generally designates the dent remover comprising the present invention.

The dent remover 10 is in the form of an elongated shaft generally referred to by the reference numeral 12 which has threadedly secured to its forward end a forward stop block generally referred to by the reference numeral 14 and formed integrally therewith, on the rearward end, a handle portion generally referred to by the reference numeral 16. Also secured to shaft 12 adjacent the handle 16 is a rear stop block 18. Slidingly secured about shaft 12 intermediate stop blocks 14 and 18 is a cylindrical sleeve which is generally referred to by the reference numeral 20. The sleeve 20 is of substantial mass or weight, in order to function as a hammer and has on its rearward end a sleeve head block 24 which acts as a hammer.

The handle 16 is formed integrally with shaft 12 and extends transversely across the rearward end thereof. Formed integrally with handle 16 is a hammer block 22 which is in alignment with and disposed remote from shaft 12.

The forward end of the shaft 12 is threaded as at 26 and is threadedly secured within a first threaded bore 28 formed in the rearward end of the forward stop block 14.

The forward end of the forward block 14 is provided with a second threaded bore 30 in which is threadedly engaged the rearward end portion 32 of the fastener 34. The fastener 34 is provided with a lock nut 36 which is adapted to be threadedly secured about the rearward threaded portion 32 in engagement with the forward end of the forward stop block 14 to frictionally retain the fastener 34 within threaded bore 30. The fastener 34 has on its forward end a tapered shank 38 having threads 40 thereon which are adapted to engage the periphery of aperture 48 formed in sheet metal panel 46. The tapered portion 38 terminates in a pointed punch 42.

In operation, the pointed punch 42 is positioned approximately in the center of the dent 44 and a hammer (not shown) is used to strike the striking block 22 so as to force the pointed punch 42 through the sheet metal 46 to form aperture 48. It is to be understood that the aperture 48 could also be formed by the use of a drill.

After aperture 48 has been formed, handle portion 16 may be used to screw the fastener 34 partially through the aperture 48 so that the threads 40 on the fastener 34 will engage and hold the sheet metal panel 46. With the tool so positioned as shown in Figure 2 of the drawings, the slide 20 may then be moved sharply to the rear of the dent remover 10 to strike the rear stop block 18 so as to pull the dented portion of the panel 46 back to its original position. It is to be understood that numerous sliding movements of the slide 20 may be necessary before the dent 44 has been removed. Further, the threaded tapered portion 38 is first positioned through the aperture with its forward end engaging the periphery of the aperture 48 so that should the force of the slide 20 striking the rear stop block 18 pull the tapered portion 48 from the panel 46, the tool may be reinserted in aperture 48 so that it engages the periphery thereof at a point where its diameter is larger.

Also, it is to be understood that in place of the fastener 34 an ordinary cap screw may be used with its shank threadedly engaged in the second threaded bore 30 and its head secured by any convenient means such as by leading, brazing, or welding to the center of the dent 44 in the body panel. In this instance, it would not be necessary to form an aperture through the body panel 46.

After all the low spots of the dent have been raised above the original position of that portion of the panel, a body file or sanding disk may be used to remove the high spots and a thin coating of the body lead may be used to remove any small marks formed in the body panel during the process of removing the dent. Also, it is to be understood that since the aperture 48 would normally be relatively small in diameter, that the lead used to finish the straightening process before the painting operation would conveniently fill the aperture 48, the latter also providing an additional means to anchor the coating of lead to the body panel 46.

Further, it is to be noted that the dent remover 10 may be used very successfully to repair dents in body panels when fiber glass fillers are used instead of the old conventional lead fillers since there is in this instance no need whatsoever for a torch of any type as the fiber glass fillers may be successfully bonded to an unheated panel.

Thus it can be seen that herein has been described a dent remover which may be used to remove smaller dents from body panels whose inner surfaces are inaccessible. Further, the dent remover is of the simplest construction with only one moving part and therefore requires little or no attention to maintain it in its working condition.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dent remover for removing dents from motor vehicle sheet metal panels and the like comprising an elongated shaft, a rear stop block fixedly secured to said shaft adjacent the rear end thereof, a sleeve slidably disposed on said shaft forwardly of said rear stop block and movable towards and away from the latter, a fixture, means on one end of said fixture for removably securing the latter to the forward end of said shaft, means adjacent the other end of said fixture for securing the latter to a dented body panel, a tapered shank on said fixture terminating in a point at its forward end, said last mentioned securing means comprising tapered threads formed on said shank rearward of said point, a transversely extending handle on the rear end of said shaft, and a hammer block on said shaft disposed rearwardly of said handle and in alignment with said shaft.

2. The combination of claim 1 wherein the rear end of said fixture is provided with an externally threaded shank, the forward end of said shaft having an internally threaded bore threadedly receiving said threaded shank, and a jam nut threadedly secured to said shank forwardly of said bore.

References Cited in the file of this patent

UNITED STATES PATENTS

| | | |
|---|---|---|
| 1,662,538 | Richmond et al. | Mar. 13, 1928 |
| 2,292,625 | Fellers | Aug. 11, 1942 |
| 2,456,845 | Ghee et al. | Apr. 12, 1949 |
| 2,605,658 | Sanchez | Aug. 5, 1952 |
| 2,749,795 | Boykin | June 12, 1956 |
| 2,791,926 | Guyton | May 14, 1957 |
| 2,799,190 | Awot | July 16, 1957 |

FOREIGN PATENTS

| | | |
|---|---|---|
| 446,114 | France | Sept. 24, 1912 |